United States Patent
Ash et al.

(10) Patent No.: US 10,049,056 B2
(45) Date of Patent: *Aug. 14, 2018

(54) DEFERRED RE-MRU OPERATIONS TO REDUCE LOCK CONTENTION

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); David B. Whitworth, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/211,594

(22) Filed: Jul. 15, 2016

(65) Prior Publication Data
US 2016/0321188 A1 Nov. 3, 2016

Related U.S. Application Data

(63) Continuation of application No. 14/505,326, filed on Oct. 2, 2014, now Pat. No. 9,547,604, and a
(Continued)

(51) Int. Cl.
*G06F 12/08* (2016.01)
*G06F 12/12* (2016.01)
(Continued)

(52) U.S. Cl.
CPC ............ *G06F 12/123* (2013.01); *G06F 9/526* (2013.01); *G06F 12/0804* (2013.01); *G06F 12/0815* (2013.01); *G06F 12/0866* (2013.01); *G06F 12/126* (2013.01); *G06F 2212/1021* (2013.01); *G06F 2212/1041* (2013.01);
(Continued)

(58) Field of Classification Search
CPC ............ G06F 12/0806; G06F 12/0808; G06F 12/084; G06F 12/0866; G06F 12/0871
See application file for complete search history.

(56) References Cited

U.S. PATENT DOCUMENTS

| 4,916,605 A | 4/1990 | Beardsley et al. |
| 6,425,050 B1 | 7/2002 | Beardsley et al. |

(Continued)

FOREIGN PATENT DOCUMENTS

| EP | 1980948 A2 | 10/2008 |
| WO | 03021395 A2 | 3/2003 |

(Continued)

OTHER PUBLICATIONS

Ding et al., "BP-Wrapper: A System Framework Making Any Replacement Algorithms (Almost) Lock Contention Free,"United States, pp. 369-380, Mar. 29, 2009 (12 pages).
(Continued)

*Primary Examiner* — Hal Schnee
(74) *Attorney, Agent, or Firm* — Griffiths & Seaton PLLC

(57) ABSTRACT

Data operations, requiring a lock, are batched into a set of operations to be performed on a per-core basis. A global lock for the set of operations is periodically acquired, the set of operations is performed, and the global lock is freed so as to avoid excessive duty cycling of lock and unlock operations in the computing storage environment.

10 Claims, 4 Drawing Sheets

Related U.S. Application Data continuation-in-part of application No. 13/616,980, filed on Sep. 14, 2012, now Pat. No. 9,733,991.

(51) Int. Cl.

| | |
|---|---|
| *G06F 9/52* | (2006.01) |
| *G06F 12/123* | (2016.01) |
| *G06F 12/0866* | (2016.01) |
| *G06F 12/126* | (2016.01) |
| *G06F 12/0804* | (2016.01) |
| *G06F 12/0815* | (2016.01) |

(52) U.S. Cl.
CPC .. *G06F 2212/281* (2013.01); *G06F 2212/313* (2013.01); *G06F 2212/62* (2013.01)

(56) References Cited

U.S. PATENT DOCUMENTS

| | | | |
|---|---|---|---|
| 6,425,051 | B1 | 7/2002 | Burton et al. |
| 6,438,661 | B1 | 8/2002 | Beardsley et al. |
| 6,490,654 | B2 | 12/2002 | Wickeraad et al. |
| 6,615,318 | B2 | 9/2003 | Jarvis et al. |
| 6,874,010 | B1 | 3/2005 | Sargent |
| 6,901,483 | B2 | 5/2005 | Robinson et al. |
| 7,822,939 | B1 | 10/2010 | Veprinsky et al. |
| 8,082,397 | B1 | 12/2011 | Ezra et al. |
| 2002/0116582 | A1 | 8/2002 | Copeland et al. |
| 2003/0033474 | A1 | 2/2003 | Lin |
| 2005/0160203 | A1 | 7/2005 | Barrick |
| 2008/0120469 | A1 | 5/2008 | Kornegay et al. |
| 2011/0161540 | A1 | 6/2011 | Chang et al. |
| 2011/0246694 | A1 | 10/2011 | Ichinose |
| 2012/0089784 | A1 | 4/2012 | Surtani et al. |
| 2012/0323872 | A1 | 12/2012 | Vasquez Lopez et al. |
| 2013/0111133 | A1 | 5/2013 | Benhase et al. |
| 2013/0185514 | A1 | 7/2013 | Benhase et al. |
| 2013/0290643 | A1 | 10/2013 | Lim et al. |
| 2013/0339643 | A1 | 12/2013 | Tekade et al. |
| 2014/0082296 | A1 | 3/2014 | Ash et al. |
| 2015/0026409 | A1 | 1/2015 | Ash et al. |

FOREIGN PATENT DOCUMENTS

| | | |
|---|---|---|
| WO | 2013132370 A1 | 9/2013 |
| WO | 2014040840 A1 | 3/2014 |

OTHER PUBLICATIONS

Jayarekha et al., "An Adaptive Dynamic Replacement Approach for a Multicast based Popularity Aware Prefix Cache Memory System," InterJRI Computer Science and Networking, vol. 1, Issue 1, pp. 24-30, Dec. 2009 (7 pages).

Wong et al., "Modified LRU Policies for Improving Second-level Cache Behavior," HPCA-6, IEEE Proceedings Sixth International Symposium on Performance Computer Architecture, pp. 49-60, 2000 (12 pages).

DEFERRED RE-MRU OPERATIONS TO REDUCE LOCK CONTENTION

CROSS REFERENCE TO RELATED APPLICATIONS

This Application is a Continuation of U.S. patent application Ser. No. 14/505,326 filed Oct. 2, 2014, which is a Continuation-in-Part Application of U.S. patent application Ser. No. 13/616,980 filed Sep. 14, 2012.

BACKGROUND OF THE INVENTION

Field of the Invention

The present invention relates in general computing systems, and more particularly to, systems and methods for increased data management efficiency in computing storage environments.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

During read hit workload, a data segment such as a track is hit in cache, and must be taken off a Least Recently Used (LRU) list from its current position, and added to a Most Recently Used (MRU) end of the LRU list. To accomplish this task, a lock operation is taken on the LRU list to remove the track and add the track back to the MRU end.

In a multi-core and/or clustered computing environment where multiple processes may have shared access to the LRU list, the tendency for contention on the list lock operation is elevated as a number of computing elements may request the list lock at any one time. Related disclosures have provided various mechanisms to address this potentially elevated contention.

An additional challenge in multi-core and/or clustered computing environments arises when the cache is full; as to make space for new Input/Output (I/O) operations, it is necessary for the cache to demote tracks from the LRU list. Since the LRU list may have modified and unmodified tracks, cache may create a "demote ready" list from the LRU list. Tracks can be demoted from the demote ready list.

Typically, a single LRU list is maintained for the multi-core/clustered computing environment, and demotion of tracks is performed by a single thread that takes the lock on the LRU list and scans the LRU list to find candidates for the demote ready list. In a multi-threaded environment (for example, 64 threads), many threads may be processing host I/O operations, and thereby demanding cache space. However, only a single thread is attempting to demote tracks. As a result, after some time has passed, the I/O may begin to queue up for cache space, and data processing efficiency slows to the speed in which the demote scan thread can process track demotions. This potential inefficiency may limit performance of certain workloads. Accordingly, a need exists for a mechanism that addresses this potential limitation.

In view of the foregoing, various embodiments for data management in a multi-core computing storage environment by a processor device are provided. A batched data operation under a single lock is used to perform data demotion operations by conducting a demotion scan and moving data to a demote ready list while the lock is held by a Most Recently Used (MRU) operation. A priority of the demotion scan is determined, wherein if a priority of the demotion scan is determined to be high, a number of tracks are moved from an active list to the demote ready list.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
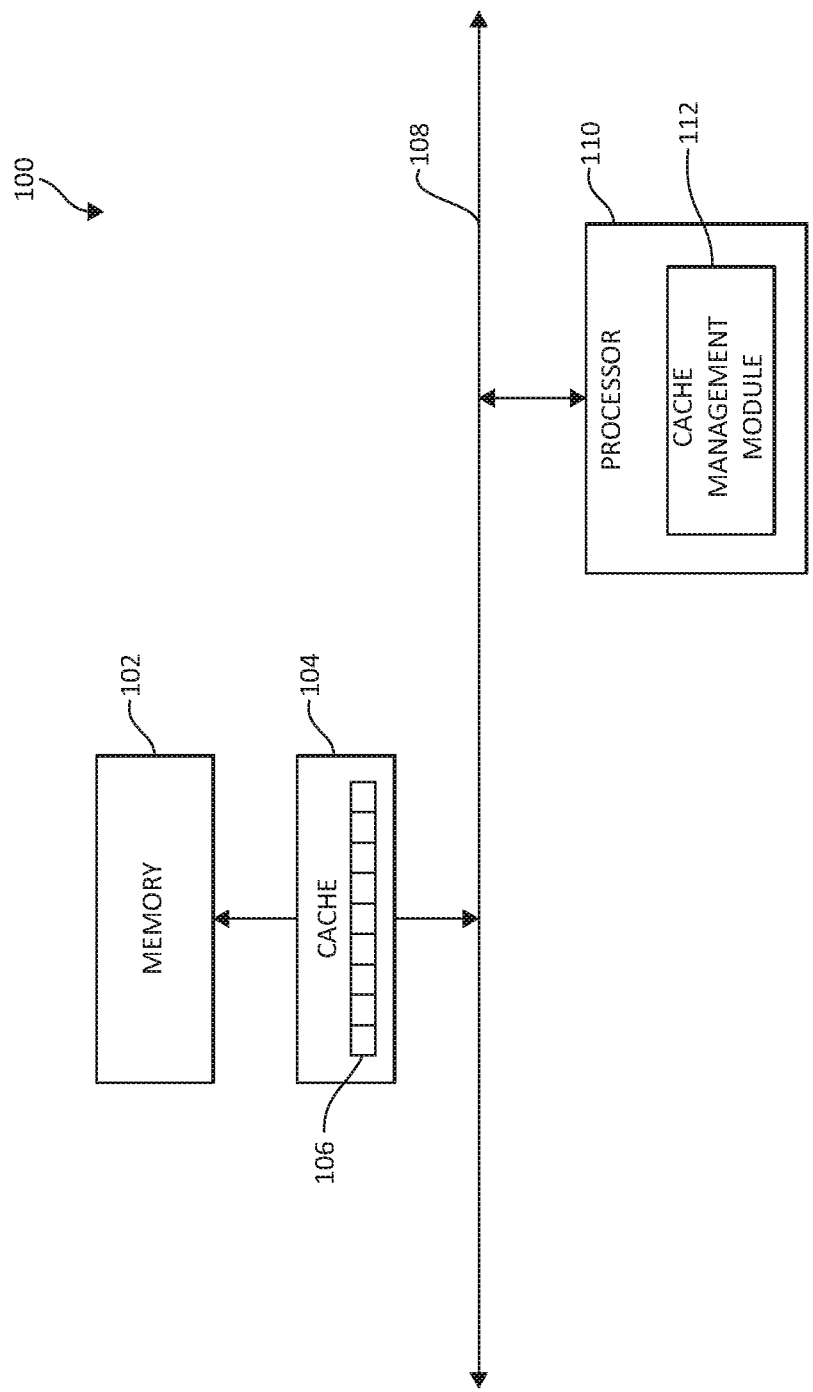
FIG. 1 is an exemplary block diagram showing a hardware structure for cache management in which aspects of the present invention may be realized.

As mentioned previously, an additional challenge in multi-core and/or clustered computing environments arises when the cache is full; as to make space for new Input/Output (I/O) operations, it is necessary for the cache to demote tracks from the LRU list. Since the LRU list may have modified and unmodified tracks, cache may create a "demote ready" list from the LRU list. Tracks can be demoted from the demote ready list.

Typically, a single LRU list is maintained for the multi-core/clustered computing environment, and demotion of tracks is performed by a single thread that takes the lock on the LRU list and scans the LRU list to find candidates for the demote ready list. In a multi-threaded environment (for example, 64 threads), many threads may be processing host I/O, and demanding cache space. However, only a single thread is attempting to demote tracks. As a result, after some time has passed, the I/O begins to queue up for cache space and efficiency slows to the speed in which the demote scan thread can process track demotions. This potential inefficiency may limit performance of certain workloads. A need exists for a mechanism that addresses this potential limitation.

The mechanisms of the illustrated embodiments alleviate the potential inefficiencies described previously by effectively adding additional work on a deferred MRU flush operation. As a result, as the deferred MRU flush operation adds tracks to an active list, the mechanisms of the illustrated embodiments move some tracks from the active list to the demote ready list. This process enables the demote operations to execute as fast as host I/O, since multiple threads may work on demote operations, and the need for an additional acquisition of an active list lock is obviated since the deferred MRU operation already has the lock. In one embodiment, as a result, the mechanisms of the present invention use an MRU operation currently holding an active list lock to also perform demotion operations.

The mechanisms of the illustrate embodiments perform deferred MRU operations for tracks irrespective of whether the tracks are in cache or not. Additionally, when a flush operation is performed when the Cache Directory Control Block (CDCB) array is full, tracks are moved from the LRU list to the demote ready list, essentially acting to add tracks to the active LRU list while also moving tracks from the active LRU list to the demote ready list.

Conventional techniques focus on reducing path length along a "critical section." In reference to the background of the current invention, such a critical section may refer to while a lock is held in the computing storage environment. Again, referring to conventional techniques, if the critical section may not be sufficiently reduced, control blocks are broken up (using, for example, independent lock operations), to reduce the duty cycle of each lock.

In contrast to these conventional techniques, which may serve to increase overhead and resource consumption, the mechanisms of the present invention seek a batching approach, which focuses on the overhead associated specifically with acquiring and freeing the lock itself. This overhead can grow as an exponential basis with the number of CPU cores and running processes in any given computing environment.

The batching methodology described herein in relation to the mechanisms of the illustrated embodiments serves to reduce the frequency at which locks are acquired and freed. In other words, in one example, a particular lock is acquired and freed ten times less, but ten times the work is performed while the lock is held. In this situation, the critical section path length essentially remains the same, however lock contention is dramatically reduced by eliminating much of the lock acquire/free overhead previously described.

In one particular exemplary embodiment, which will be described in more detail, following, so as to enable one of ordinary skill in the art to make and use the present invention, a specific application of batching is applied to the LRU list in a computing storage/cache environment. In the LRU case, list order of tracks becomes important. The conventional approach of breaking a control block up is undesirable, since list order is not maintained across multiple LRU lists (a single LRU list is shared between resources).

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing.

In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

In various embodiments, processor 110 comprises or has access to a cache/data management module 112, which comprises computer-readable code that, when executed by processor 110, causes processor 110 to perform data management operations in accordance with aspects of the illustrated embodiments. In the various embodiments, processor 110 uses batched data operation under single lock to perform data demotion operations by conducting a demotion scan and moving data to a demote ready list while lock is held by a Most Recently Used (MRU) operation.

In various other embodiments, processor 110 acquires a High-Contention Active List lock.

In various other embodiments, processor 110 performs a MRU operation on an instant CDCB and all CDCBs on the applicable array.

In various other embodiments, processor 110 determines whether an applicable demotion scan is high in priority.

In various other embodiments, processor 110 determines whether a count of tracks on the Active List is higher than demote-ready tracks.

In various other embodiments, processor 110 determines whether a percentage of the count of demote-ready tracks is less than a number of tracks needed for a high-priority demote scan.

In various other embodiments, processor 110 moves a certain number of tracks from the Active List to the Demote-ready List.

Finally, in various other embodiments, processor 110 releases the Active List Lock.

Figure 2:
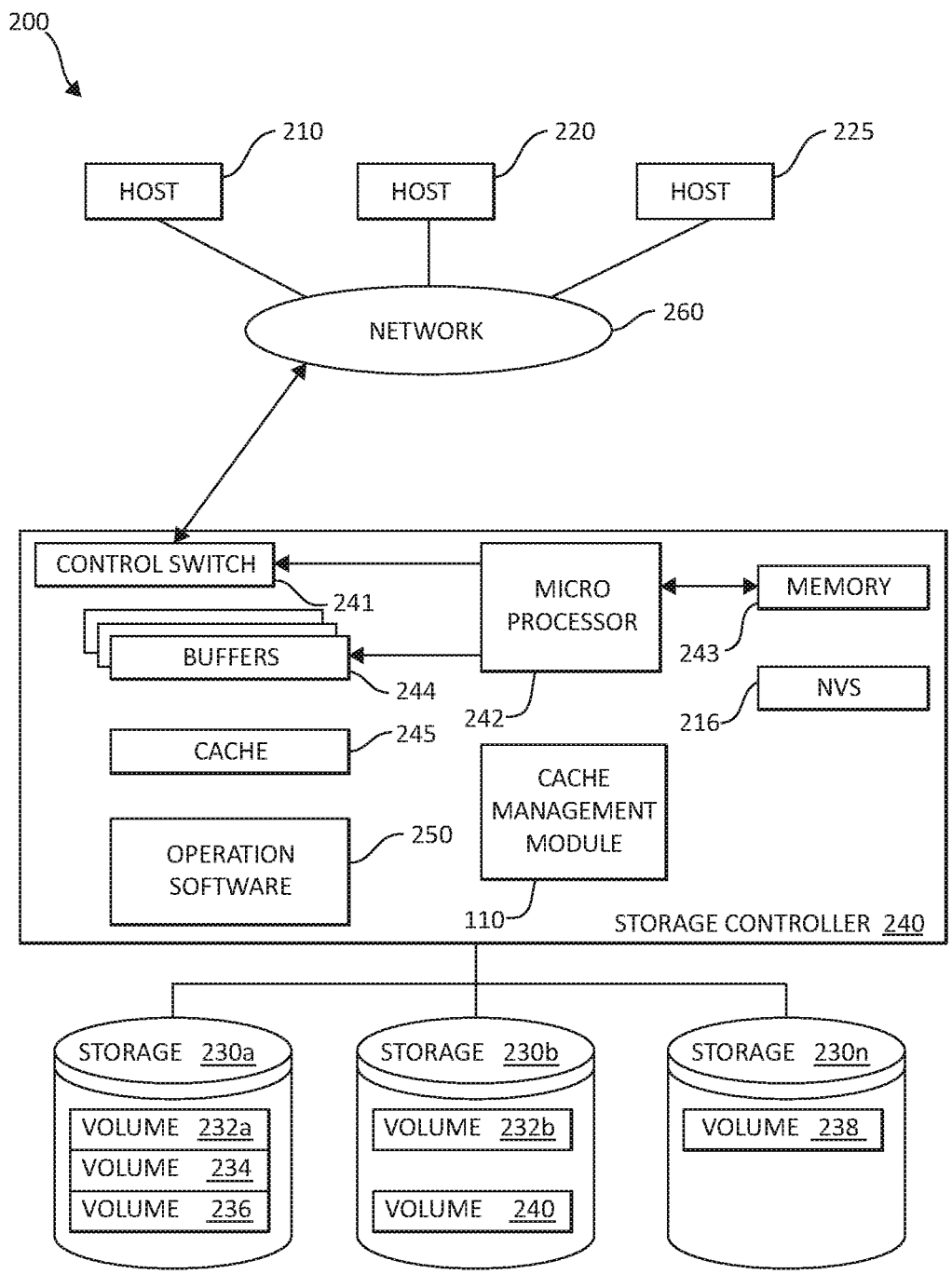
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over Ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a cache management module 112. The cache management module 112 may incorporate internal memory (not shown) in which the destaging algorithm may store unprocessed, processed, or "semi-processed" data. The cache management module 112 may work in conjunction with each and every component of the storage controller 240, the hosts 210, 220, 225, and other storage controllers 240 and hosts 210, 220, and 225 that may be remotely connected via the storage fabric 260. Cache management module 112 may be structurally one complete module or may be associated and/or included with other individual modules. Cache management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the cache management module 112, in which information may be set. The multiple buffers 244 may be implemented to assist with the methods and steps as described herein.

Figure 3:
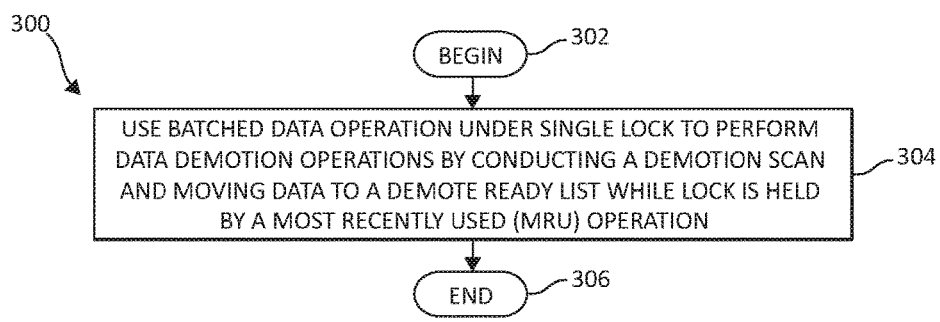
FIG. 3 is a flow chart diagram illustrating an exemplary method for increased efficiency in data management in a computing storage environment, again in which aspects of the present invention may be realized.

Turning now to FIG. 3, a flow chart diagram, illustrating a generalized method 300 for data management, is depicted. Method 300 begins (step 302). A batched data operation under a single lock is used to perform data demotion operations by conducting a demotion scan and moving data to a demote ready list while the lock is held by a Most Recently Used (MRU) operation (step 304). The method 300 then ends (step 306).

With the foregoing general methodology in mind, consider the following specific application to an LRU environment in computer storage. In a first step for configuration purposes, a per-CPU array of a certain number (say, N) of Cache Directory Control Blocks (CDCB), using an index or pointer mechanism is added. In addition, a per-CPU Lock (low contention), and a flag bit per CDCB is added. In one embodiment, this flag bit may be termed re-MRU_Owed, indicating when high that the track needs to be-MRUed.

Once the foregoing configurations have been made, consider the batching methodology reviewed in FIG. 3 specifically applied as a foreground process by, if an instant CPU array is full, MRUing the CDCB and all CDCBs on a particular array once an Active List Lock (high contention) is acquired. Once the lock is acquired, the foreground process then makes determinations as to whether the applicable demote scan is high priority by performing functions such as determining counts of tracks on the Active List and counts of demote ready tracks, for example, as previously described. Under the lock, various demotion activities may then be conducted concurrently by a number of threads, such as moving demotion ready tracks from the Active List. Once these demotion activities have concluded, the lock may then be released.

If the array is not full, the CDCB is added to the CPU CDCB array, and a new flag indicating the CDCB is on a CPU array, is set. Once either of the preceding steps have been accomplished, a Flush operation may then be performed to flush each CPU array.

With the instant example still in view, in the event of a CDCB demotion from cache (e.g., a new CPU array flag is set), if the instant process leading to the Demote was not pursuant to a directory scan, the track may be skipped (i.e., the track was accessed and will be subsequently MRUed). Alternatively, each of the CPU arrays may be scanned, and the CDCB removed.

Figure 4:
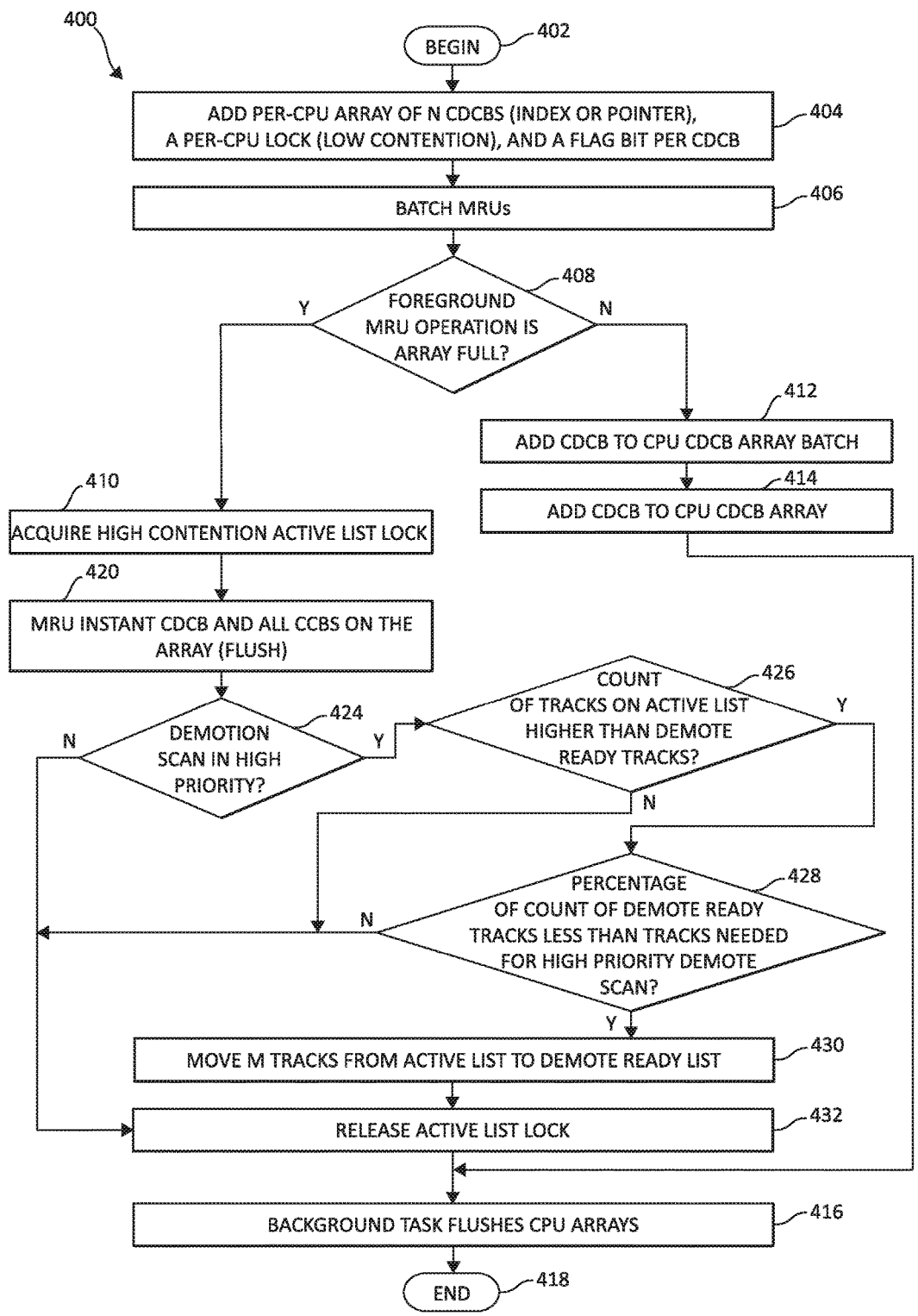
FIG. 4 is an additional flow chart diagram illustrating an exemplary method for performing various operations for data management enhancement, again in which aspects of the present invention may be implemented.

Turning now to FIG. 4, elements of the foregoing example are realized as an exemplary flow chart diagram of a method 400 for data processing, here again in which aspects of the illustrated embodiments may be implemented. Method 400 begins (step 402) with the addition of the per-CPU array of N CDCBs (index or pointer), a per-CPU Lock (low contention) and a flag bit per-CDCB as previously described (step 404). In step 406, which refers generally to batching MRU's, the method 400 moves to step 408, which in a foreground MRU process, queries if an instant CPU array is filled. If yes, the Active List is acquired (step 410). If no, the CDCB is added to the CPU CDCB array (step 412), and a new flag is set to indicate the CDCB is on the CDCB array (step 414). In a subsequent, background task, the CPU arrays are flushed as previously described (step 416). The method 400 then ends (step 418).

Returning to step 410, once the high contention active list lock is acquired, a MRU operation on the instant CDCB and all CDCB's on the appropriate Array is performed in what could be termed a Flush operation (step 420). The method 400 then performs some diagnostic determinations of the state of tracks on the active list and demote ready list as follows. In a following decision step 424, the method 400 queries whether the demotion scan to be performed is of a high priority (step 424). In one embodiment, this may be determined by obtaining a count of free cache segments, and whether a particular threshold has been crossed to indicate that the system is running low on free cache segments. The high priority determination may also be indicated by a count of tracks on the active list higher than demote ready tracks in the following decision step 426. In addition, if a percentage of the count of demote ready tracks is less than tracks deemed to be needed for the high priority demote scan in the following decision step 428, then the method 400 moves to step 430, where a certain number M of tracks deemed necessary in view of the diagnostic operations performed previously are moved from the active list to the demote ready list. The active list lock is then released (step 432), and the method 400 then continues to step 416 as described above.

Consider the foregoing illustrated embodiment in view of the perspective of several storage processes. One exemplary process moves tracks from an Active List to a demote-ready list. In this scenario, if such scan reveals a track which has the Re-MRU_Owed bit set, then the scan will simply re-MRU the track and reset the re-MRU_Owed bit. It will not move the track to the demote ready list.

In an exemplary case of a Demote Scan operation, tracks will be examined in the demote ready list and demoted if there are not active users. When the scan reveals a track which has the Re-MRU_Owed bit set, then this scan will remove the track from the demote ready list, and move it to the Active List. The re-MRU_Owed bit is then reset.

In an exemplary case of a Demote Track operation, a track may be demoted without passing through the aforementioned Demote Scan operation. For example, a copy target track from before a peer-to-peer relationship was established may be demoted without passing through the Demote Scan operation. An alternative case exists when the host discards the tracks from cache.

When the track is demoted, the cache may check to see if the re-MRU_Owed bit is set. If the bit is set, the Demote Track operation will scan all the CPU arrays and remove the track.

As previously mentioned, the Flush operation may be configured as a background process to flush all CPU arrays. The background process may be enhanced in certain embodiments. In one particular embodiment, the background process may increment a 2 bit counter (per-CPU array) once every predetermined time interval, while a foreground CPU process zeroes the 2 bit counter each time the CPU CDCB array is flushed. If the 2 bit counter becomes the value 2, the foreground process flushes its CPU CDCB. Alternatively, if the 2 bit counter becomes the value 3, the background task process flushes that particular CPU's CDCB array.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for data management in a multi-core computing storage environment by a processor device, comprising:
   using a batched data operation under a single lock to perform data demotion operations by conducting a demotion scan and moving data to a demote ready list while the lock is held by a Most Recently Used (MRU) operation;
   determining a priority of the demotion scan, wherein if a priority of the demotion scan is determined to be high, moving a number of tracks from an active list to the demote ready list;
   determining the priority of the demotion scan by counting a number of free cache segments, wherein if the number of free cache segments is less than a predetermined threshold, designating the priority of the demotion scan as high; and
   comparing a count of tracks on the active list to a count of demote ready tracks; wherein the number of tracks from the active list are moved to the demote ready list if the count of tracks on the active list is higher than the count of demote ready tracks, and a predetermined percentage of the count of demote ready tracks is less than a number of tracks needed to be freed by the demotion scan.

2. The method of claim 1, further including performing at least one of acquiring an active list lock and releasing the active list lock.

3. The method of claim 1, further including performing the MRU operation in a foreground process in the computing storage environment.

4. A system for data management in a multi-core computing storage environment, comprising:
   a processor device, operable in the multi-core computing storage environment, wherein the processor device:
      uses a batched data operation under a single lock to perform data demotion operations by conducting a demotion scan and moving data to a demote ready list while the lock is held by a Most Recently Used (MRU) operation,
      determines a priority of the demotion scan, wherein if a priority of the demotion scan is determined to be high, moving a number of tracks from an active list to the demote ready list,
      determines the priority of the demotion scan by counting a number of free cache segments, wherein if the number of free cache segments is less than a predetermined threshold, designating the priority of the demotion scan as high, and
      compares a count of tracks on the active list to a count of demote ready tracks;
   wherein the number of tracks from the active list are moved to the demote ready list if the count of tracks on the active list is higher than the count of demote ready tracks, and a predetermined percentage of the count of demote ready tracks is less than a number of tracks needed to be freed by the demotion scan.

5. The system of claim 4, wherein the processor device performs at least one of acquiring an active list lock and releasing the active list lock.

6. The system of claim 4, wherein the processor device performs the MRU operation in a foreground process in the computer storage environment.

7. The system of claim 4, wherein the batched data operation includes a read hit workload in a cache of the computing storage environment.

8. A computer program product for data management in a multi-core computing storage environment, the computer program product comprising a non-transitory computer-readable storage medium having computer-readable program code portions stored therein, the computer-readable program code portions comprising:
   an executable portion that uses a batched data operation under a single lock to perform data demotion operations by conducting a demotion scan and moving data to a demote ready list while the lock is held by a Most Recently Used (MRU) operation;

an executable portion that determines a priority of the demotion scan, wherein if a priority of the demotion scan is determined to be high, moving a number of tracks from an active list to the demote ready list;

an executable portion that determines the priority of the demotion scan by counting a number of free cache segments, wherein if the number of free cache segments is less than a predetermined threshold, designating the priority of the demotion scan as high; and an executable portion that compares a count of tracks on the active list to a count of demote ready tracks; wherein the number of tracks from the active list are moved to the demote ready list if the count of tracks on the active list is higher than the count of demote ready tracks, and a predetermined percentage of the count of demote ready tracks is less than a number of tracks needed to be freed by the demotion scan.

9. The computer program product of claim 8, further including an executable portion that performs at least one of acquiring an active list lock and releasing the active list lock.

10. The computer program product of claim 8, further including an executable portion that performs the MRU operation in a foreground process in the computing storage environment.

* * * * *